(12) United States Patent
Macxis, Jr. et al.

(10) Patent No.: US 11,301,539 B2
(45) Date of Patent: Apr. 12, 2022

(54) JUST-IN-TIME FRONT END TEMPLATE GENERATION USING LOGICAL DOCUMENT OBJECT MODELS

(71) Applicant: Bank of America Corporation, Charlotte, NC (US)

(72) Inventors: Mardochee Macxis, Jr., Concord, NC (US); Sandeep Gandhi, Charlotte, NC (US); Christopher Smith, Charlotte, NC (US); Eugene Rohrwasser, Charlotte, NC (US); Brandon Minton, Charlotte, NC (US); Sunny Singh, Gastonia, NC (US)

(73) Assignee: Bank of America Corporation, Charlotte, NC (US)

(*) Notice: Subject to any disclaimer, the term of this patent is extended or adjusted under 35 U.S.C. 154(b) by 368 days.

(21) Appl. No.: 16/281,268

(22) Filed: Feb. 21, 2019

(65) Prior Publication Data
US 2020/0272681 A1    Aug. 27, 2020

(51) Int. Cl.
| | |
|---|---|
| G06F 40/205 | (2020.01) |
| G06F 16/958 | (2019.01) |
| G06F 40/117 | (2020.01) |
| G06F 16/25 | (2019.01) |
| G06F 16/9538 | (2019.01) |
| G06F 40/106 | (2020.01) |
| G06F 40/166 | (2020.01) |

(52) U.S. Cl.
CPC .......... *G06F 16/972* (2019.01); *G06F 16/252* (2019.01); *G06F 16/9538* (2019.01); *G06F 40/106* (2020.01); *G06F 40/117* (2020.01); *G06F 40/166* (2020.01); *G06F 40/205* (2020.01)

(58) Field of Classification Search
CPC ............................ G06F 40/106; G06F 16/951
See application file for complete search history.

(56) References Cited

U.S. PATENT DOCUMENTS

| | | |
|---|---|---|
| 5,448,740 A | 9/1995 | Kiri et al. |
| 6,826,726 B2 | 11/2004 | Hsing et al. |
| 7,046,778 B2 | 5/2006 | Martin et al. |
| 7,047,318 B1 * | 5/2006 | Svedloff ............... G06F 16/958 709/246 |

(Continued)

*Primary Examiner* — Scott T Baderman
*Assistant Examiner* — Mario M Velez-Lopez
(74) *Attorney, Agent, or Firm* — Banner & Witcoff, Ltd.

(57) ABSTRACT

Aspects of the disclosure relate to processing systems for performing just-in-time front end template generation using a logical DOM. A computing device may receive, from a web server host platform, an HTML page with a DOM structure. The computing device may parse the DOM structure to generate a logical DOM, which may include a key value store identifying dynamic elements to be updated based on data received from a data source different from the web server host platform. The computing device may receive, from a data source computer system, source data. The computing device may modify the logical DOM, based on the source data, by replacing the dynamic elements with corresponding values from the source data. This may produce a first updated real DOM. The computing device may render a first graphical user interface based on the first updated real DOM, and may display the first graphical user interface.

20 Claims, 16 Drawing Sheets

(56) References Cited

U.S. PATENT DOCUMENTS

| | | | |
|---|---|---|---|
| 7,216,350 B2 | 5/2007 | Martin et al. | |
| 7,287,018 B2 | 10/2007 | Lennon | |
| 7,590,644 B2 | 9/2009 | Matsakis et al. | |
| 7,669,183 B2 | 2/2010 | Bowman et al. | |
| 7,800,616 B2 | 9/2010 | Said et al. | |
| 7,836,010 B2 | 11/2010 | Hammond et al. | |
| 7,895,595 B2 | 2/2011 | Hammond et al. | |
| 7,933,906 B2 | 4/2011 | Hammond et al. | |
| 8,543,907 B1 | 9/2013 | Roskind | |
| 8,621,495 B2 | 12/2013 | Chen et al. | |
| 8,725,725 B2 | 5/2014 | Hammond et al. | |
| 8,799,357 B2 | 8/2014 | Clift et al. | |
| 8,819,649 B2 | 8/2014 | Lafreniere et al. | |
| 8,978,033 B2 | 3/2015 | Hammond et al. | |
| 9,003,381 B2 | 4/2015 | Conrod et al. | |
| 9,134,978 B1 | 9/2015 | Roskind | |
| 9,207,914 B2 | 12/2015 | Miadowicz et al. | |
| 9,348,871 B2 | 5/2016 | Hammond et al. | |
| 9,348,872 B2 | 5/2016 | Hammond et al. | |
| 9,367,588 B2 | 6/2016 | Hammond et al. | |
| 9,384,245 B2 | 7/2016 | Hammond et al. | |
| 9,424,004 B2 | 8/2016 | Miadowicz et al. | |
| 9,430,452 B2 | 8/2016 | Qu et al. | |
| 9,805,009 B2 | 10/2017 | Lillesveen | |
| 9,898,445 B2 | 2/2018 | Reshadi et al. | |
| 9,898,446 B2 | 2/2018 | Weber et al. | |
| 10,187,489 B2 | 1/2019 | Mineo | |
| 2008/0077653 A1* | 3/2008 | Morris | G06F 16/986 709/203 |
| 2008/0282150 A1* | 11/2008 | Erwin | G06F 16/957 715/255 |
| 2010/0250706 A1* | 9/2010 | Burckart | H04L 67/02 709/219 |
| 2010/0262780 A1* | 10/2010 | Mahan | G06F 15/16 711/118 |
| 2015/0193399 A1* | 7/2015 | Woker | H04L 41/02 715/234 |
| 2016/0026611 A1* | 1/2016 | Liu | G06F 40/194 715/234 |
| 2017/0031871 A1* | 2/2017 | Nikitin | G11C 7/1072 |
| 2019/0243881 A1* | 8/2019 | Zia | G06F 40/143 |

* cited by examiner

```
<h1>Welcome to Logical DOM</h1>

<div ::bind="user.personalInfo">{firstName}</div>

<ul ::bind="accounts.listing">
    <li>{title}</li>
</ul>

<div ::bind="accounts.listing">
    <div>
        <h2>My Account</h2>
        Account: {title}
        Balance: $ {balance}
    </div>
</div>

<div>More Info</div>
```

FIG. 3

```
{
    user: {
        personalInfo: {
            id: "UserID"
            firstName:"First1"
        }
    },
    accounts: {
        listing: [
            {
                title: "Account1",
                balance: 3473.75
            },
            {
                title: "Account2",
                balance: 11983.51
            }
        ]
    }
}
```

```
<h1>Welcome to Logical DOM</h1>

//**-- This gets patched with real DOM
<div> "First1"/div>

//**-- This gets patched with real DOM
<ul>
    <li>Checking xxxx</li>
    <li>Money Market yyyy</li>
</ul>

//**-- This gets patched with real DOM
<div>
    <div>
        <h2>My Account</h2>
        Account: Checking xxxx
        Balance: $ 3473.75
    </div>

<div>
        <h2>My Account</h2>
        Account: Money Market yyyy
        Balance: $ 11983.51
    </div>
</div>

<div>More Info</div>
```

FIG. 7

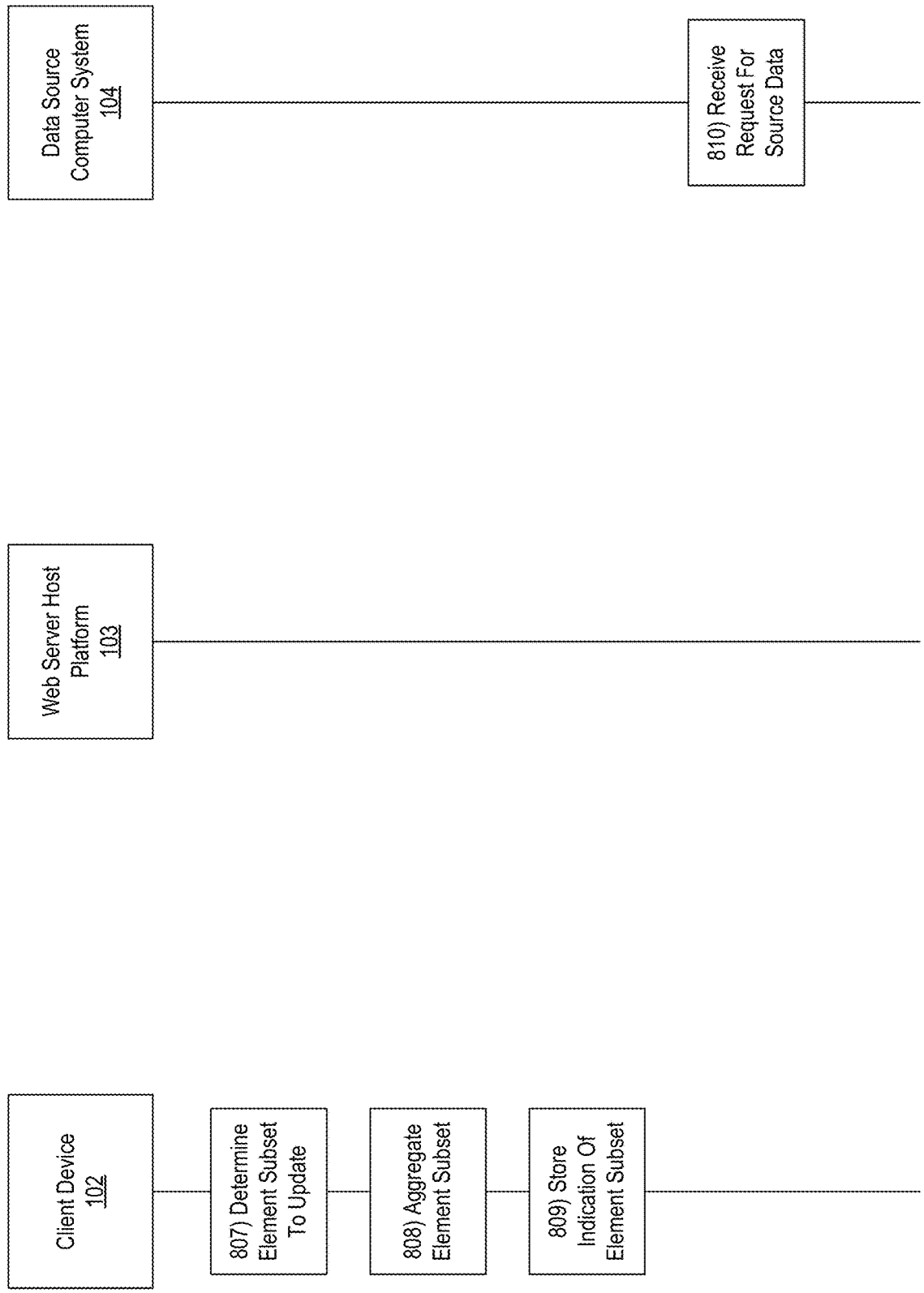

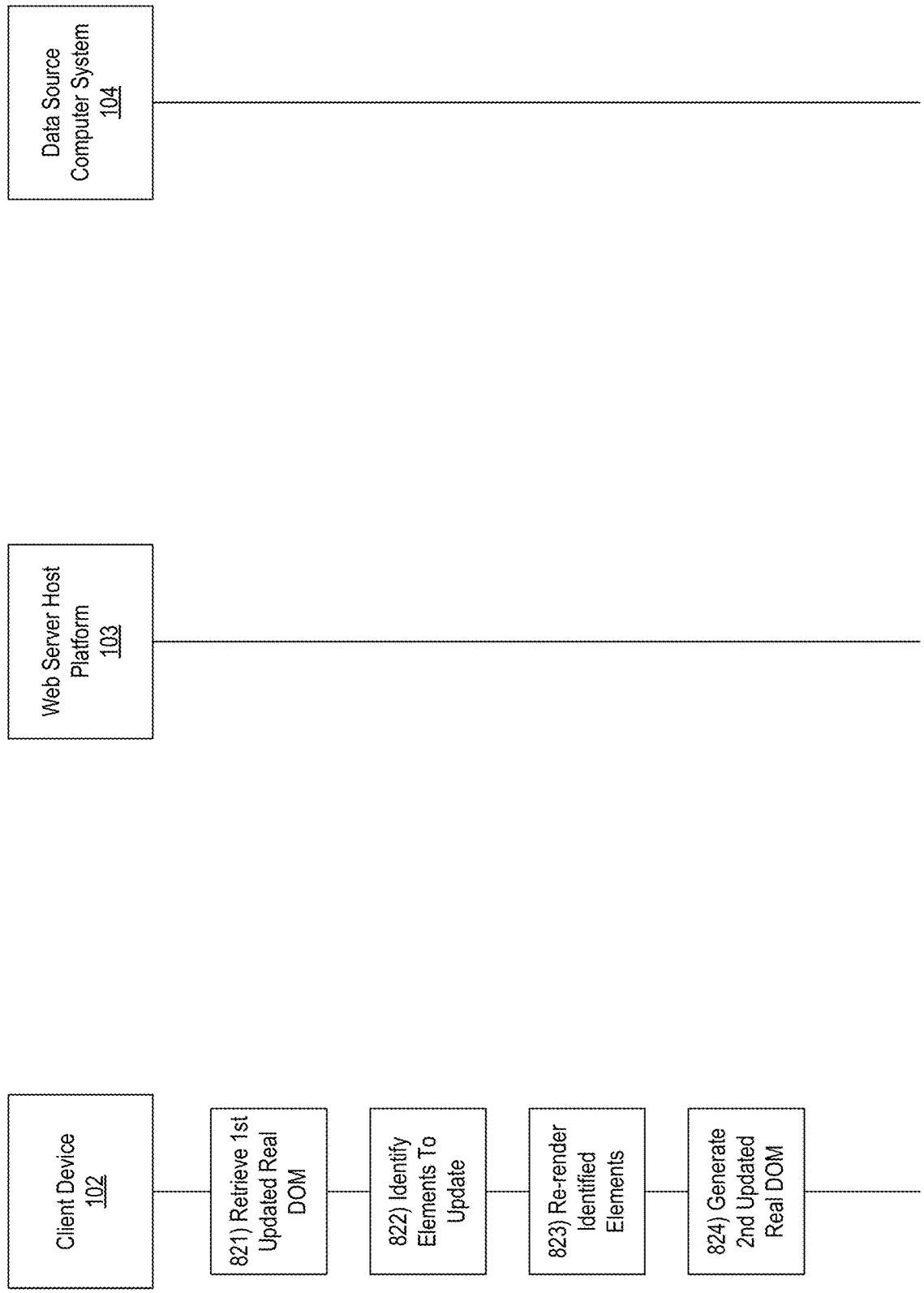

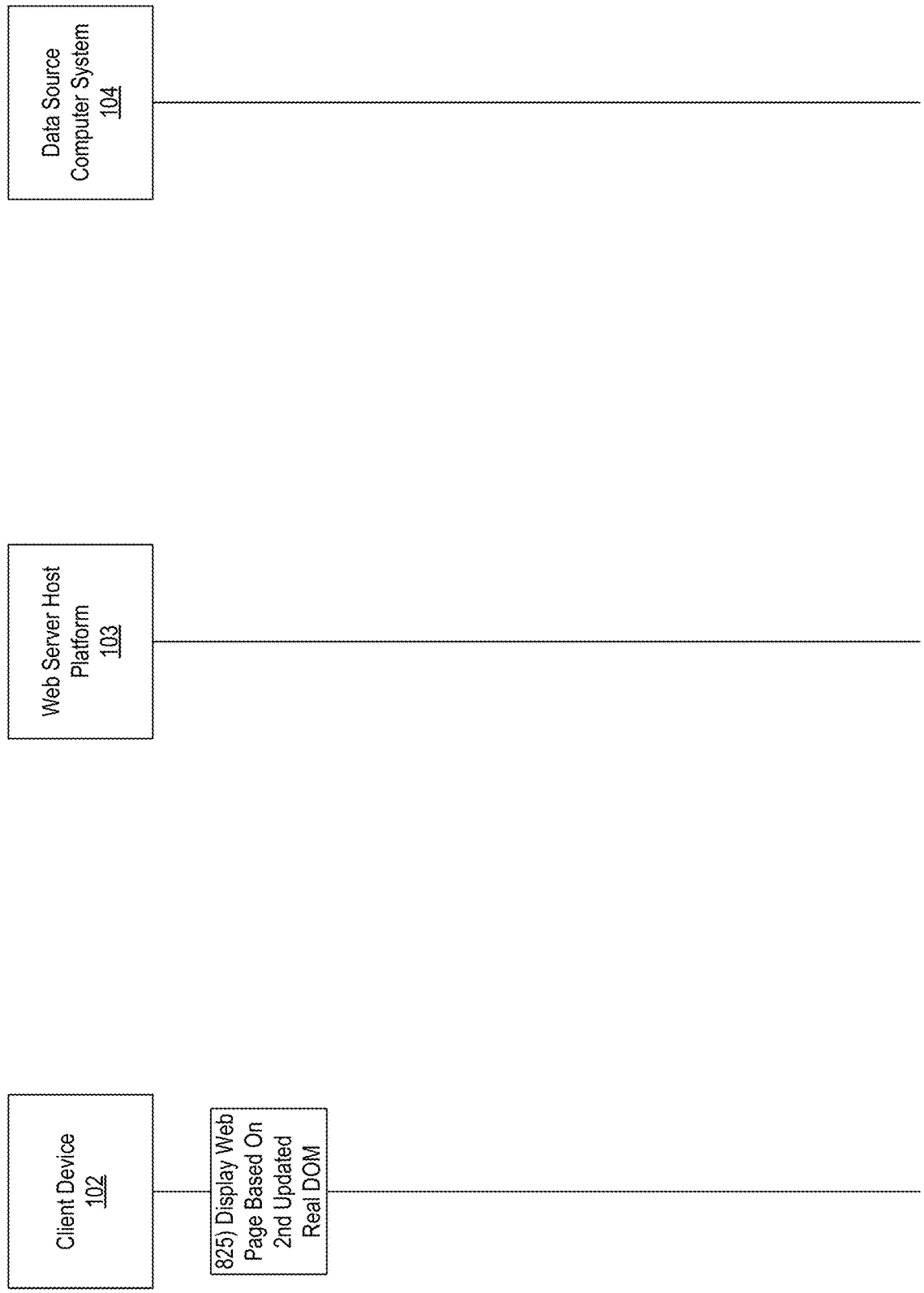

905

Web Page Interface

Welcome, "First Name" "Last Name!"

Web Page Interface

Welcome, "First Initial." "Last Name!"

JUST-IN-TIME FRONT END TEMPLATE GENERATION USING LOGICAL DOCUMENT OBJECT MODELS

BACKGROUND

Aspects of the disclosure relate to electrical computers and digital processing systems, data transferring, and enhanced processing systems for web page modification at front end client devices. In particular, one or more aspects of the disclosure relate to computing devices that implement logical document object models.

Many large enterprise organizations deploy customer-facing portals to provide access to user accounts. In many cases, these portals are deployed as a collection of authenticated web pages. In some instances, it may be desirable to include dynamic content on such pages. It may be difficult, however, to embed dynamic content in user facing web portals—on a large scale—while also improving and optimizing the consumption of computing resources and network bandwidth for the enterprise server infrastructure that hosts such pages.

SUMMARY

Aspects of the disclosure provide effective, efficient, scalable, and convenient technical solutions that address and overcome the technical problems associated with front end user interface generation. For example, some aspects of the disclosure provide techniques that may enable computing devices to generate just-in-time front end templates using logical document object models. By using logical document object models, a client device may be able to update a subset of identified elements on a page without updating others. Furthermore, the client device may update the page without modifying the underlying source data on which the page is based. Accordingly, client devices may overcome deficiencies associated with conventional techniques for updating web pages. In doing so, the client device may conserve network bandwidth and client side processing resources. Furthermore, the client device may overcome challenges associated with web page management by increasing data editing capabilities at the front end.

In accordance with one or more embodiments of the disclosure, a computing device comprising at least one processor, a communication interface, and memory storing computer-readable instructions may receive, from a web server host platform, a HyperText Markup Language (HTML) page comprising a document object model (DOM) structure. The computing device may parse the DOM structure associated with the HTML page received from the web server host platform to generate a logical DOM, which may include a key value store identifying one or more dynamic elements to be updated based on data received from at least one data source different from the web server host platform. The computing device may receive, from a data source computer system, source data. Based on the source data, the computing device may modify the logical DOM by replacing the one or more dynamic elements with corresponding values from the source data received from the data source computer system. In one or more instances, this may produce a first updated real DOM. Based on the first updated real DOM, the computing device may render a first graphical user interface. The computing device may display the first graphical user interface rendered based on the first updated real DOM.

In one or more instances, the computing device may receive, after displaying the first graphical user interface, updated source data from the data source computer system. Based on the updated source data, the computing device may modify the modified logical DOM, by replacing the one or more dynamic elements with corresponding values from the updated source data received from the data source computer system. In these instances, this may produce a second updated real DOM. Based on the second updated real DOM, the computing device may re-render the graphical user interface. The computing device may display the re-rendered graphical user interface.

In one or more instances, in receiving the source data, the computing device may receive user account data. In one or more instances, after receiving the updated source data, the computing device may retrieve the first updated real DOM. Based on the first updated real DOM, the computing device may determine the modified logical DOM.

In one or more instances, the key value store may maintain a reference from each of the one or more dynamic elements to corresponding elements in the DOM structure. In one or more instances, the computing device may receive user input requesting access to the first graphical user interface.

In one or more instances, the computing device may identify the one or more dynamic elements based on one or more bind attributes associated with tags in the HTML page. In one or more instances, the computing device may store the key value store locally on the computing device.

In one or more instances, the computing device may receive a user input corresponding to the source data. The computing device may send an indication of the user input corresponding to the source data to the data source computer system, which may cause the data source computer system to generate the updated source data.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 3 and 4 depict illustrative HTML files for deploying an enhanced processing system that performs just-in-time front end template generation using logical document object models in accordance with one or more example embodiments;

FIGS. 6 and 7 depict illustrative HTML files for deploying an enhanced processing system that performs just-intime front end template generation using logical document object models in accordance with one or more example embodiments;

FIGS. 8A-8F depict an illustrative event sequence for deploying an enhanced processing system that performs just-in-time front end template generation using logical document object models in accordance with one or more example embodiments;

FIGS. 9 and 10 depict example graphical user interfaces for deploying an enhanced processing system that performs just-in-time front end template generation using logical document object models in accordance with one or more example embodiments.

DETAILED DESCRIPTION

Figure 1A:
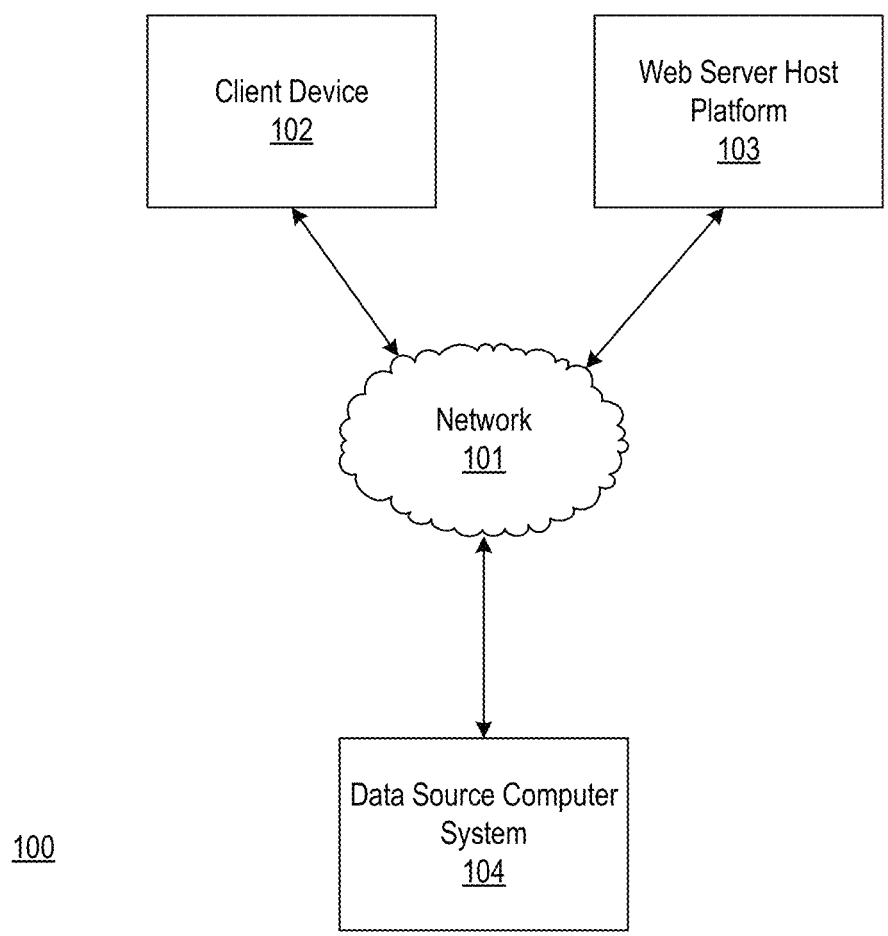
FIGS. 1A and 1B depict an illustrative computing environment for deploying an enhanced processing system that performs just-in-time front end template generation using logical document object models in accordance with one or more example embodiments.

In the following description of various illustrative embodiments, reference is made to the accompanying drawings, which form a part hereof, and in which is shown, by way of illustration, various embodiments in which aspects of the disclosure may be practiced. In some instances other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

One or more aspects of the disclosure relate to a just-in-time (JIT), framework-agnostic, front-end, declarative templating language. For example, aspects of the disclosure provide a methodology that may provide a foundation for an enterprise level declarative front end/HyperText markup language (HTML) templating language, which may render and update document object model (DOM) elements in-place when data changes.

The declarative templating language may be a superset of HTML and may use HTML data attributes (e.g., declaratives) to put template directives on DOM elements. In these instances, a real DOM may be available at run time, and a client device may use a DOM-API (application programmable interface) to retrieve DOM elements containing a data binding path attribute that indicates elements to be tracked for update. Accordingly, the client device may maintain a reference of the binding elements in memory, which may allow it to perform the in place update. In these instances, the DOM elements may have a reference in the real DOM. In some instances, rather than maintaining the entire DOM in memory, the client device may store only the elements that are to be updated with their real reference in the real DOM. In these instances, the client device might not manage an application state, but rather it may receive a state manager or store. Such a state manager may contain an observer, in which one or more methods described herein may be subscribed to, so as to receive an updated state.

In one or more instances, the client device may trigger changes after performing the state changes. In these instances, if the client device does not perform the state change, the changes might not be triggered. In some instances, the client device may perform one or more methods described herein on at least the following data types: string, array, plain object, number, null and undefined.

In such instances, the data provided to the client device may be pre-computed, and may correspond to a final value at the time of rendering. Accordingly, in some instances, the data might not include functions or be executable. The data provided may be immutable, and might not be configured to be updated by effects, variables, or external functions.

In one or more instances, the client device may maintain an internal key value store with the string of the data binding path as key, and a reference list of elements to be updated. When a new state is received from the state manager, the client device may perform one or more methods described herein to retrieve the data binding keys and compare each of them to the new state. When a data binding key matches a data key in the state, the client device may trigger the elements from the matching data binding key to be updated.

In one or more instances, one or more systems and methods described herein may implement a one way data flow and one way data binding. In these instances, the systems and methods may consume data from a single store.

In one or more instances, the client device may perform the following types of manipulation: interpolations, iterations, adding and removing elements, adding and removing attributes (class, src, href, or the like), adding and removing DOM events listener, adding and removing accessibility attributes in a page, Javascript computation (e.g., using EcmaScript-2015 template literals or the like), or the like. In one or more instances, the directives (e.g., bind, show, class, or the like) may be declarative and available in the elements. In some instances, one or more systems and methods described herein may implement Javascript, cascading style sheets (CSS), HTML, DOM-API, or the like.

In some instances, one or more processes described herein may be referred to as logical DOM. In one or more instances, when the DOM is available, the client device may make a copy of the corresponding HTML block, and may extract elements with a binding directive in memory. In determining whether the elements have a binding directive, the client device may determine that the elements contain an HTML data attribute (e.g., ::bind {firstName}). After making a copy of the HTML, the client device may retrieve elements from the logical DOM memory using the HTML that was copied. During this process, the client device may perform other HTML specific updates without touching the real DOM. Once the updates are complete, the client device may add the updated DOM back into the real DOM. After parsing the elements to retrieve the elements with a binding directive, the client device may aggregate elements with the same binding together, while keeping a reference to the real DOM. In these instances, the client device may store these references at the logical DOM. Once the elements are mapped together, the client device may use the logical DOM to hold actions for iterations, interpolations, actions to hide/show/add/remove elements, or the like. The client device may then render the elements by performing the aforementioned interpolations, iterations, attribute modifications, or the like, without touching the DOM. After rendering the elements, the client device may retrieve the elements that were rendered in memory, and may update the real DOM elements without touching or diffing other elements by using the references of the elements to be updated.

As a result of this process, the DOM may become a representation of a state of a web page. Accordingly, a client device may update binding elements in place and incrementally one element at a time. In one or more instances, instead of parsing an entire DOM, the client device may only retrieve elements containing a data binding attribute, which may match a key from the data source. Upon updating the DOM, the client device may verify whether the data-binding-key matches the data/state provided, and if so, update that element directly in the DOM (e.g., because the element already has a reference, there might not be a need to query the DOM or look for the element in the DOM). Accordingly, this may make the DOM more predictable because the DOM may be a representation of the state. It might only update elements that have a new state changed. In these instances, if the same state is pushed to the same elements, they might not be updated as the real DOM may already match the content to be updated.

This may make web applications easier to modify and debug on the front end. For example, rather than having to reach out to the server to perform modifications of the underlying source data, a web developer may deal directly with the user interface. In addition, sometimes source data may be shared between multiple web pages or entities, and developers might not have leverage to modify the underlying source data. Accordingly, one or more of the methods and systems described herein may provide an efficient and technical solution to address this concern. Furthermore, rather than having a backend server send an entirely new web page each time there is a content update and forcing a browser to re-render the entire page, the browser at the client device might maintain a single page, and the backend server may send updated data which may cause the logical DOM to selectively update certain elements. This may reduce network bandwidth usage, and may similarly conserve processing power on the client side.

Figure 1B:
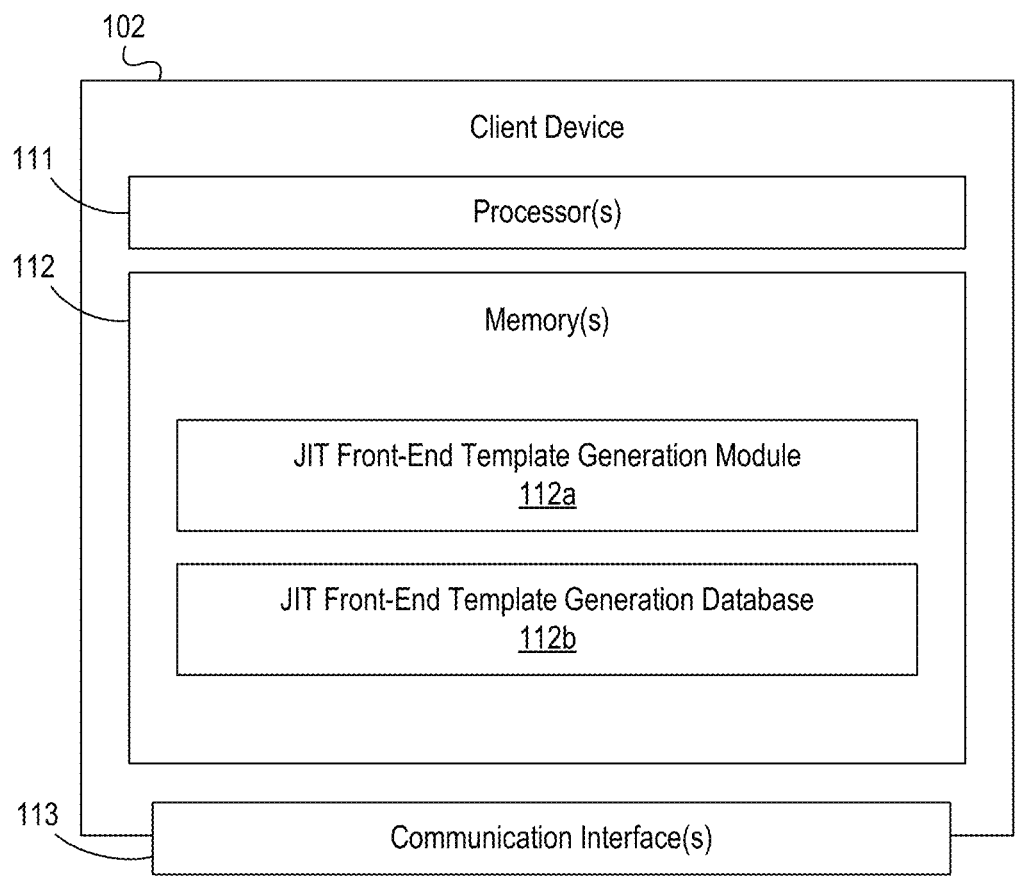

FIGS. 1A-1B depict an illustrative computing environment for deploying an enhanced processing system that performs just-in-time front end template generation using logical document object models in accordance with one or more example embodiments. Referring to FIG. 1A, computing environment 100 may include one or more computer systems. For example, computing environment 100 may include a client device 102, a web server host platform 103, and a data source computer system 104.

As illustrated in greater detail below, client device 102 may include one or more computing devices and/or other computer components (e.g., processors, memories, communication interfaces). Client device 102 may cause display of and/or otherwise present one or more graphical user interfaces (e.g., browser interfaces based on HTML pages received from the web server host platform 103). In some instances, the client device 102 may be a desktop computer, a laptop computer, a tablet, a mobile device, or the like. In one or more instances, the client device 102 may be configured to receive one or more real document object models (DOM). Additionally, the client device 102 may be configured to generate and modify one or more logical DOMs based on the real DOM in accordance with one or more methods described herein. In these instances, the client device 102 may modify the one or more document object models based on source data received from the data source computer system 104.

Web server host platform 103 may be a computer system that includes one or more computing devices (e.g., servers, server blades, or the like) and/or other computer components (e.g., processors, memories, communication interfaces). In one or more instances, web server host platform 103 may be configured to receive requests for online content, and may serve HTML pages (comprising a DOM structure) to the client device 102 in response. In these instances, the web server host platform 103 may be configured to cause source data to be sent from the data source computer system 104 to the client device 102.

Data source computer system 104 may be a computer system that includes one or more computing devices (e.g., servers, server blades, or the like) and/or other computer components (e.g., processors, memories, communication interfaces) that may be used to store source data, such as user account data. In these instances, the data source computer system 104 may be configured to send the source data to the client device 102. In one or more instances, the data source computer system 104 may store, host, or otherwise provide user account data associated with customers of an institution (e.g., a financial institution, or the like). Alternatively, the data source computer system 104 may be associated with a third party other than the institution, and may provide supplementary source data (e.g., social media data, or the like). In these instances, the source data stored may be used by the client device 102 to generate one or more graphical user interfaces.

Computing environment 100 also may include one or more networks, which may interconnect client device 102, web server host platform 103, and data source computer system 104. For example, computing environment 100 may include a network 101 (which may interconnect, e.g., client device 102, web server host platform 103, and data source computer system 104).

In one or more arrangements, client device 102, web server host platform 103, and data source computer system 104 may be any type of computing device capable of receiving a user interface, receiving input via the user interface, and communicating the received input to one or more other computing devices. For example, client device 102, web server host platform 103, data source computer system 104, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of client device 102, web server host platform 103, and data source computer system 104 may, in some instances, be special-purpose computing devices configured to perform specific functions.

Referring to FIG. 1B, client device 102 may include one or more processors 111, memory 112, and communication interface 113. A data bus may interconnect processor 111, memory 112, and communication interface 113. Communication interface 113 may be a network interface configured to support communication between client device 102 and one or more networks (e.g., network 101, or the like). Memory 112 may include one or more program modules having instructions that when executed by processor 111 cause client device 102 to perform one or more functions described herein and/or one or more databases that may store and/or otherwise maintain information which may be used by such program modules and/or processor 111. In some instances, the one or more program modules and/or databases may be stored by and/or maintained in different memory units of client device 102 and/or by different computing devices that may form and/or otherwise make up client device 102. For example, memory 112 may have, host, store, and/or include a JIT front-end template generation module 112a and a JIT front-end template generation database 112b. JIT front-end template generation module 112a may have instructions that direct and/or cause client device 102 to execute JIT front-end template generation techniques, as discussed in greater detail below. JIT front-end template generation database 112b may store information used by JIT front-end template generation module 112a and/or client device 102 in executing efficient updates to stored document object models and/or in performing other functions. In one or more instances, in executing the updates to the stored document object models, the client device 102 element certain elements of the document object models (received from the web server host platform 103) based on source data received from the data source computer system 104.

Figure 2:
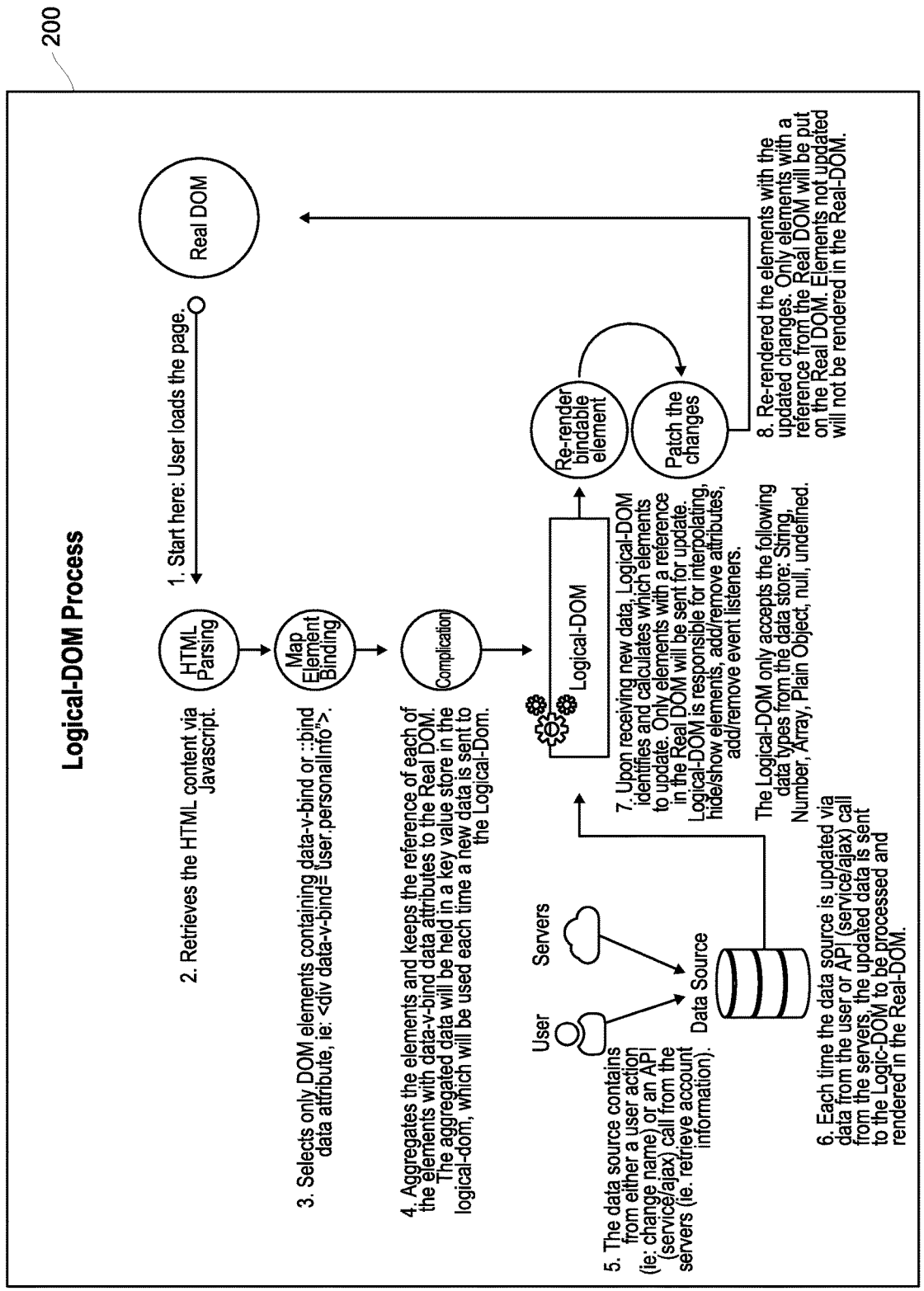
FIG. 2 depicts an illustrative logical DOM process for deploying an enhanced processing system that performs just-in-time front end template generation using logical document object models in accordance with one or more example embodiments.

FIG. 2 illustrates a logical DOM process for performing just-in-time front end template generation using logical document object models in accordance with one or more example embodiments. Referring to the logical DOM process 200 of FIG. 2, an HTML page may be loaded at a client device (e.g., client device 102) in response to a user input requesting a particular website.

The client device 102 may then parse the HTML page and retrieve HTML content via Javascript. In one or more instances, once a DOM corresponding to the HTML page is available and ready on the page, the client device 102 may make a copy of the HTML page and extract any elements with the binding directive in memory. In determining whether the elements have a binding directive, the client device 102 may determine that the elements have an HTML data attribute (::bind). For example, the client device 102 may determine that the element includes <div ::bind= "user.personalInfo">{firstName}</div>.

After making a copy of the HTML, the client device 102 may retrieve elements in the logical DOM memory using the HTML that was copied. During this process, along with the elements retrieval, the client device 102 may perform other HTML specific updates. In these instances, the client device 102 might not touch the real DOM until all operations are complete. Once completed, the client device 102 may add the updated DOM back into the real DOM. Example HTML file 305, which is displayed in FIG. 3, shows an example of this copied HTML file described above. The client device 102 may determine which elements of the example HTML file 305 should be extracted based on their association with (or lack thereof) a binding directive.

Figure 4:
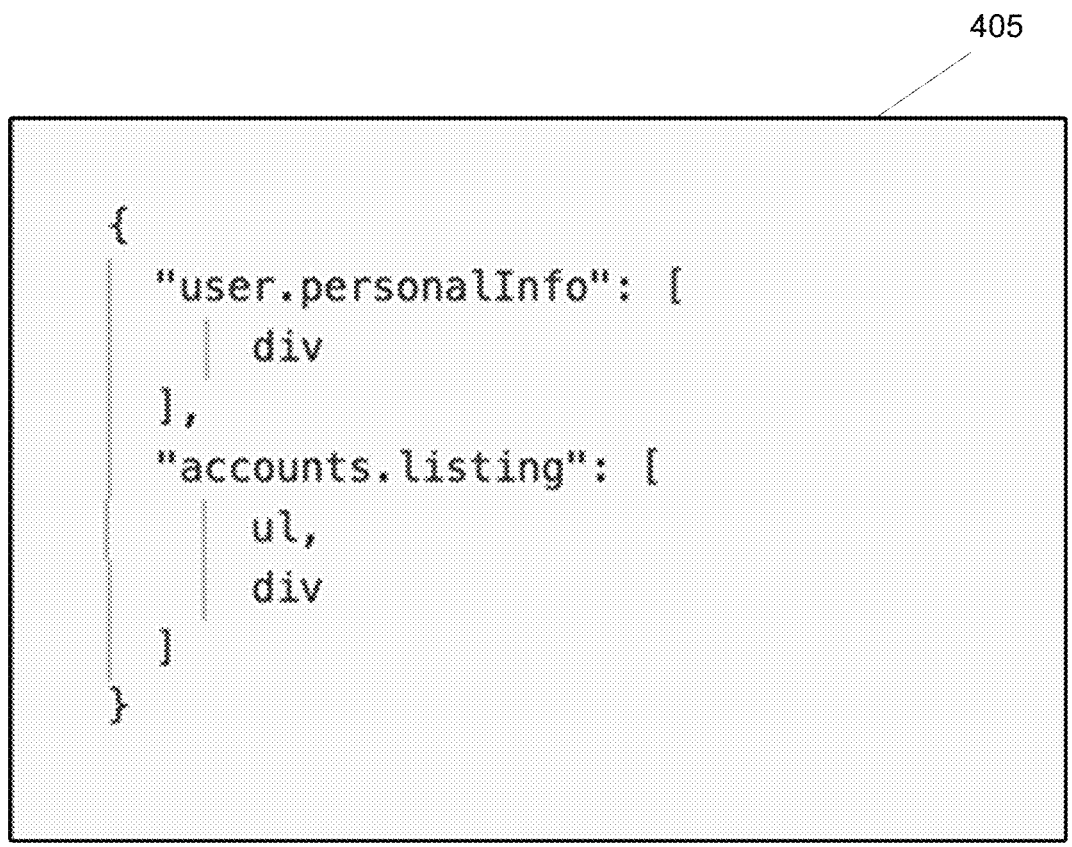

After parsing the HTML to retrieve the elements with binding directive, the client device 102 may aggregate elements with the same binding together, keeping a reference to the real DOM. For example, the client device 102 may select DOM elements containing data-v-bind or ::Bind attribute (e.g., <div data-v-bind="user.personalinfo">). In one or more instances, the client device 102 may store this data in a logical DOM. In one or more instances, in performing such map element binding, the client device 102 may generate a file similar to example HTML file 405, which is shown in FIG. 4. As is evident when comparing example HTML file 405 to example HTML file 305, example HTML file 405 has only the DOM elements from example HTML file 305 that were associated with a binding attribute.

Once the client device 102 maps the elements together, it may use the logical DOM to hold actions for iterations, interpolations or action to hide/show or add and remove elements. In one or more instances, the client device 102 may direct the logical DOM based on the data received. In performing this compilation step, the client device 102 may aggregate the elements and may maintain a reference of each element associated with a binding attribute to the real DOM. The client device 102 may maintain the aggregated elements in a key value store in the logical DOM, which may be used each time new source data is received.

The data source (e.g., data source computer system 104) may contain data from a user action (e.g., a name change command) or an API (service/ajax) call from the servers (e.g., retrieve account information), such as web server host platform 103. In one or more instances, when the data source is updated via data from the client device 102 or the web server host platform 103, the data source may send the updated data to the client device 102, which directs the updated data to the logical DOM for processing and rendering. This updated data is reflected in example HTML file 605, which is shown in FIG. 6.

In some instances, the client device 102 may use the logical DOM to identify and calculate which elements to update. In these instances, the client device 102 may update elements with a reference in the real DOM. The client device 102 may use the logical DOM for interpolation, hide/show commands, add/remove attributes, add/remove event listeners, or the like. In some instances, the client device 102 might only accept the following data types from the data source: string, number, array, plain object, null, or undefined.

In one or more instances, the client device 102 may render the elements with the updated changes. As noted above, in these instances, the client device 102 may only include elements with a reference to the real DOM in the updated real DOM. In these instances, the client device might not render elements without a reference to the real DOM in the updated real DOM. In rendering the elements, the client device 102 may get the new state/data that was provided to the logical DOM. In these instances, the client device 102 may use the logical DOM to interpolate, iterate, hide, show, add, remove, change attributes (class, src, href, or the like), or the like.

The client device 102 may perform this rendering in response to each state change. For each element that matches entries in the updated states, the client device 102 may use the logical DOM to compare their previous state with the new state. If the states are the same, the client device 102 might not patch the element. If the states are different, the client device 102 may render the elements and send them for patching.

In patching the elements, the client device 102 may save each element reference in the logical DOM. Having the reference of the element to be updated, the client device 102 may use the logical DOM to directly update the real DOM element without touching or diffing any other elements. This may be the last process, until the data changes again (at which point the client device 102 may initiate a re-render).

Figure 5:
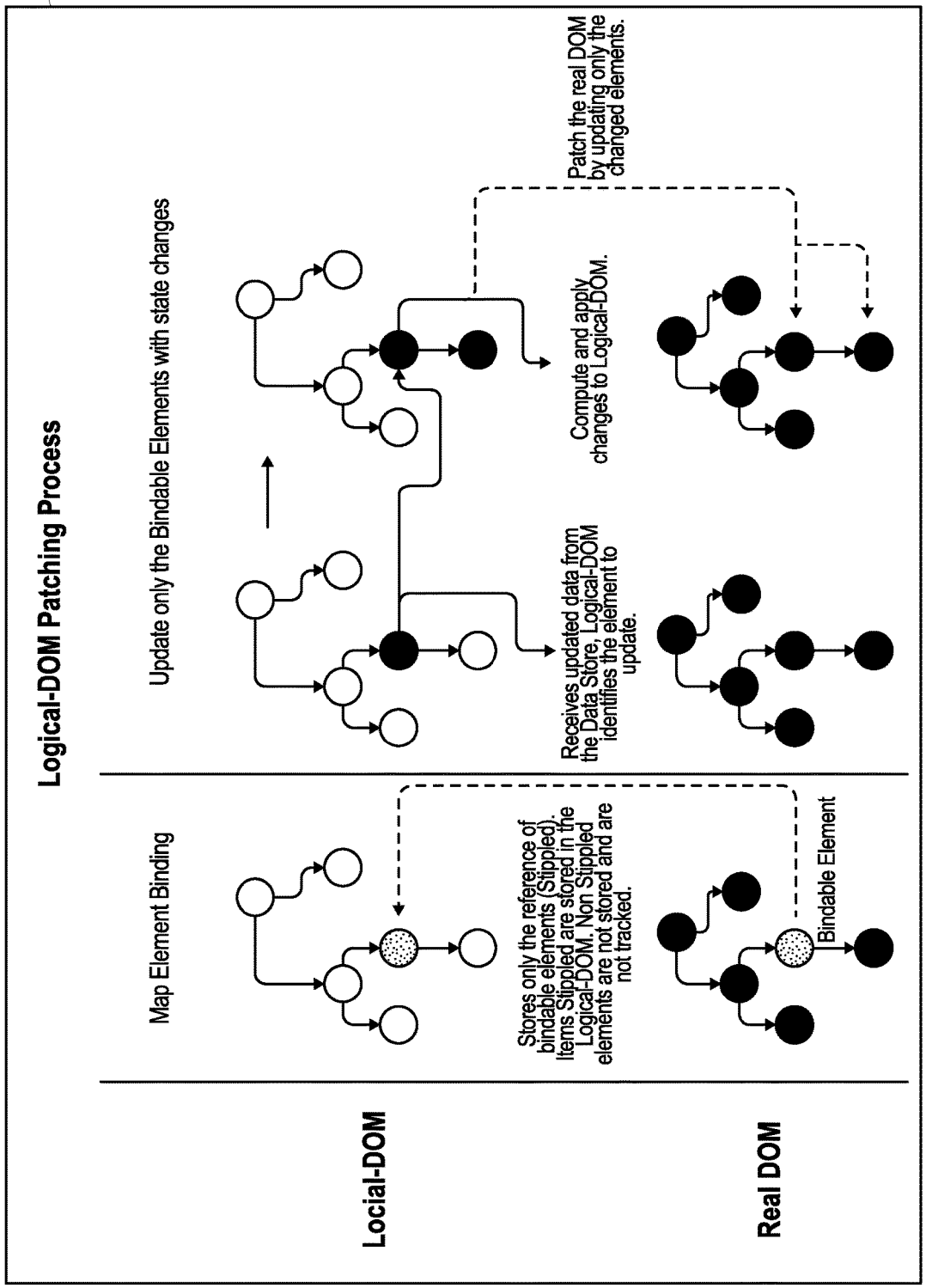
FIG. 5 depicts an illustrative logical DOM patching process for deploying an enhanced processing system that performs just-in-time front end template generation using logical document object models in accordance with one or more example embodiments.

This patching process is further described with regard to the patching process flow diagram 500, which is shown in FIG. 5. As shown in the patching process flow diagram 500, the client device 102 may store, using the logical DOM, only the references to bindable elements from the real DOM. In these instances, the client device 102 might not store or track references to the other elements from the real DOM. The client device 102 may then receive updated data from the data store (e.g., data source computer system 104), and may use the logical DOM to determine which elements to update. The client device 102 may then compute and apply the changes in the logical DOM, and may patch the real DOM by updating only the changed elements. This rendering is further illustrated in example HTML file 705, which is shown in FIG. 7.

Figure 8A:
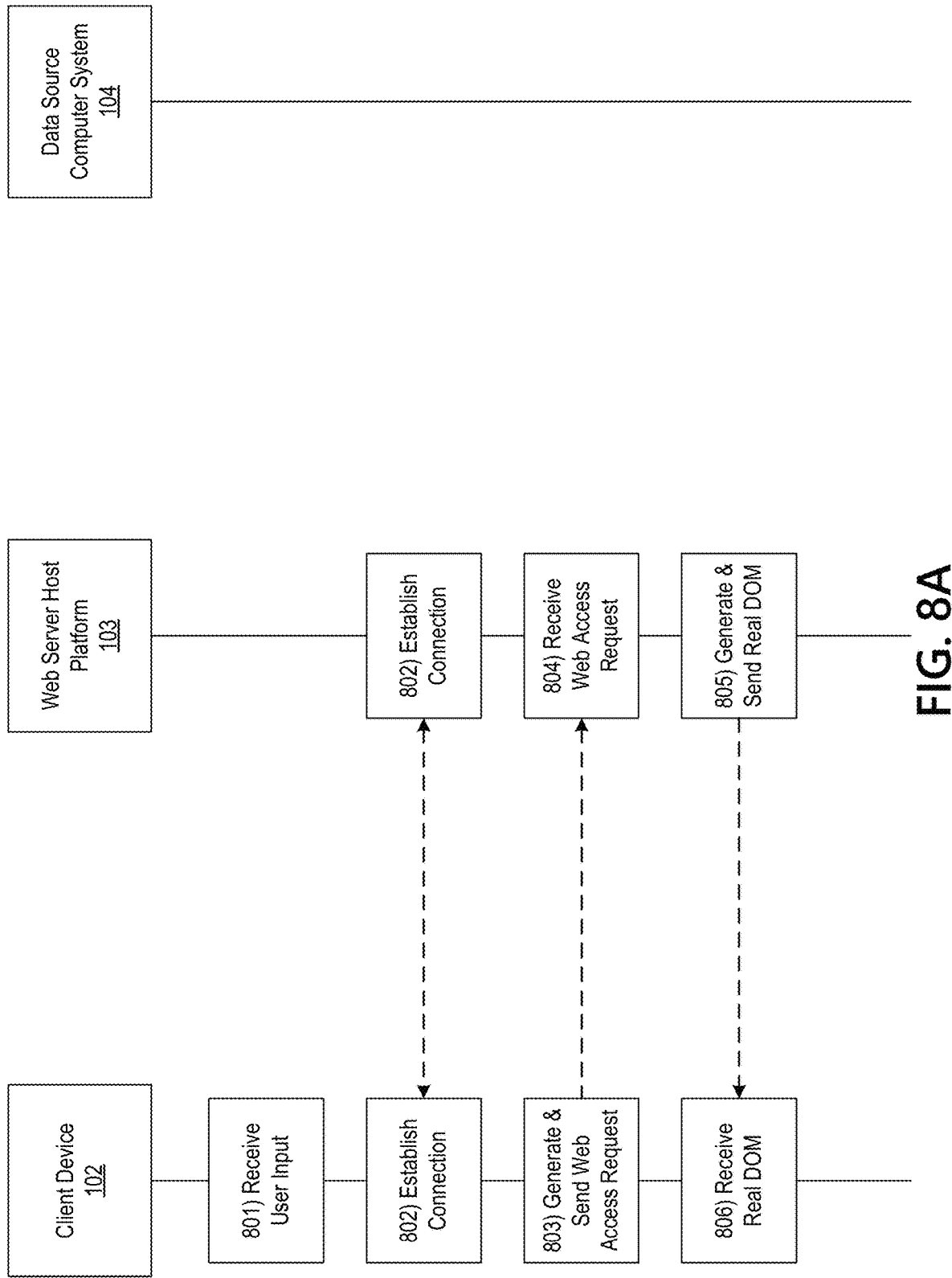

FIGS. 8A-8F depict an illustrative event sequence for just-in-time front end template generation using logical document object models in accordance with one or more example embodiments. Referring to FIG. 8A, at step 801, the client device 102 may receive a user input indicating a request to access a website. In one or more instances, the client device 102 may receive the user input via a display of the client device 102. In these instances, in receiving the user input, the client device 102 may receive a request to access an online account service, such as an online banking service provided by a financial institution.

At step 802, the client device 102 may establish a connection with the web server host platform 103. In one or more instances, the client device 102 may establish a first wireless data connection with the web server host platform 103 to link the client device 102 to the web server host platform 103.

At step 803, the client device 102 may generate and send a web access request to the web server host platform 103. In one or more instances, in generating the web access request, the client device 102 may generate a request for access to the website indicated by the user input received at step 801. In these instances, the client device 102 may send the web access request to the web server host platform 103 via the communication interface 113 and while the first wireless data connection is established.

At step 804, the web server host platform 103 may receive the web access request sent at step 803. In one or more instances, the web server host platform 103 may receive the web access request while the first wireless data connection is established.

At step 805, the web server host platform 103 may generate, in response to the web access request received at step 804, a HyperText Markup Language (HTML) page formatted with a document object model (DOM) structure. In one or more instances, this DOM HTML page may be referred to as a real DOM, and the real DOM may correspond to a graphical user interface that may be displayed at the client device 102. After generating the real DOM, the web server host platform 103 may send the real DOM to the client device 102. In these instances, the web server host platform 103 may send the real DOM to the client device 102 while the first wireless data connection is established. In one or more instances, in generating the real DOM, rather than generating and sending a graphical user interface corresponding to the real DOM, the web server host platform 103 may generate and send real DOM interface information that may be used by the client device 102 to generate a graphical user interface corresponding to the real DOM.

At step 806, the client device 102 may receive the real DOM sent at step 805. In one or more instances, the client device 102 may receive the real DOM via the communication interface 113 and while the first wireless data connection is established.

Referring to FIG. 8B, at step 807, the client device 102 may determine a subset of elements of the real DOM that should be updated. In doing so, the client device 102 may retrieve the HTML content corresponding to the real DOM using Javascript commands. In one or more instances, the client device 102 may parse the HTML content, and may select only DOM elements containing a binding directive. In these instances, in determining whether the DOM elements contain a binding directive, the client device 102 may determine whether the DOM elements contain an HTML data attribute (e.g., ::bind) such as <div::bind="user.personalinfo">{firstName}</div>. In one or more instances, the DOM elements selected by the client device 102 may correspond to the element subset that should be updated. In one or more instances, rather than parsing the HTML content and selecting DOM elements from the real DOM itself, the client device 102 may generate a copy of the HTML content that may be used for element retrieval and that may contain references to the real DOM (e.g., a logical DOM). In one or more instances, in selecting the DOM elements, the client device 102 may determine a plurality of placeholder tokens that should be updated to reflect received source data. For example, the client device 102 may determine that the real DOM contains placeholder tokens corresponding to "first name," "last name," "account balance," or the like. Actions performed at step 807 are further described above with regard to the HTML parsing and map element binding of the logical DOM process 200, which is shown in FIG. 2.

At step 808, the client device 102 may aggregate the element subset determined at step 807. In aggregating the element subset, the client device 102 may maintain a reference between each element in the logical DOM to its corresponding element in the real DOM. In one or more instances, in aggregating the element subset, the client device 102 may aggregate the plurality of placeholder tokens.

At step 809, the client device 102 may store this aggregated element subset at a key value store that comprises a portion of the logical DOM. In one or more instances, the client device 102 may already have a key value store that it is maintaining. In other instances, the client device 102 may generate the key value store based on the references and elements aggregated at step 808. Actions performed at steps 808 and 809 are further described above with regard to the compilation step of the logical DOM process 200, which is shown in FIG. 2.

At step 810, the data source computer system 104 may receive a request for source data. In one or more instances, in receiving the request for source data, the data source computer system 104 may receive a request from the client device 102 (e.g., in response to a user input), a request from the web server host platform 103 (e.g., an ajax call, service call, application programmable interface (API) call, or the like), or the like. In one or more instances, the data source computer system 104 may receive the request for source data from the web server host platform 103 at substantially the same time as the real DOM is received by the client device 102. In one or more instances, in receiving the request for source data, the data source computer system 104 may receive a request for account data (e.g., names, account numbers, balances, or the like) corresponding to an account at a financial institution. Actions described at step 810 are further described above with regard to the data source in the logical DOM process 200, which is shown in FIG. 2.

Figure 8C:
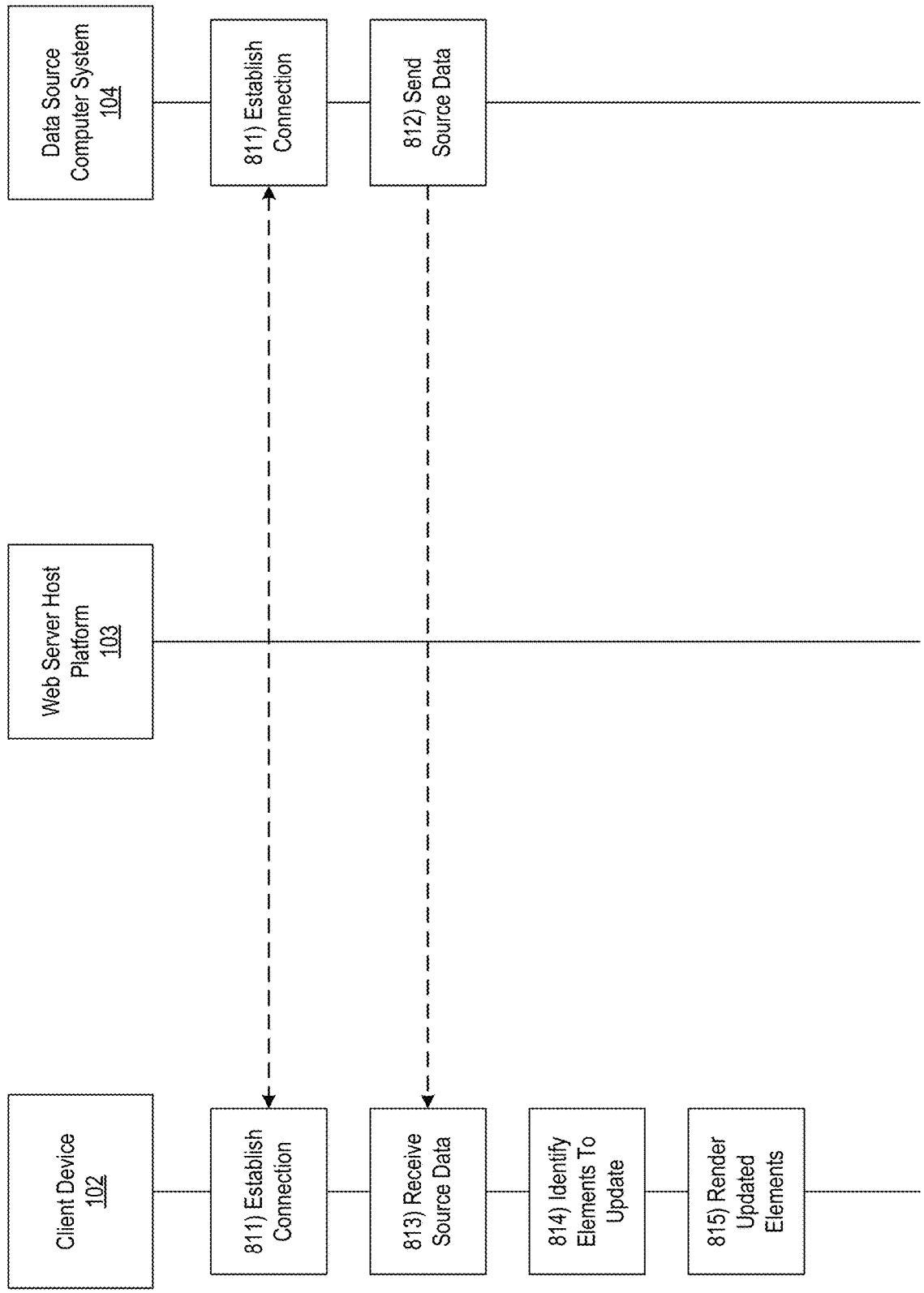

Referring to FIG. 8C, at step 811, the data source computer system 104 may establish a connection with the client device 102. In one or more instances, the data source computer system 104 may establish a second wireless data connection with the client device 102 to link the data source computer system 104 to the client device 102.

At step 812, the data source computer system 104 may send source data to the client device 102 based on the request received at step 810. In one or more instances, in sending the source data, the data source computer system 104 may send account data (e.g., corresponding to one or more accounts at a financial institution). In these instances, in sending the source data, the data source computer system 104 may send data of one of the following types: string, number, array, plain object, null, or undefined. In one or more instances, the data source computer system 104 may send the source data to the client device 102 while the second wireless data connection is established.

At step 813, the client device 102 may receive the source data sent at step 812. In one or more instances, the client device 102 may receive the source data via the communication interface 113 and while the second wireless data connection is established.

At step 814, the client device 102 may use the logical DOM to identify which elements to update based on the source data received at step 813. For example, the client device 102 may determine that only source data corresponding to the element subset aggregated at step 808 should be updated. Accordingly, in some instances, the client device 102 may update the subset of placeholder tokens with the corresponding source data without updating the remainder of the elements. For example, in using the logical DOM to identify which elements to update, the client device 102 may access the key value store of the logical DOM and may determine which elements have an associated bind attribute and/or reference to the real DOM. For example, the client device 102 may access the element subset stored at step 809. In addition, the client device 102 may determine which, if any, of the identified elements correspond to the source data. In these instances, the client device 102 may determine that these elements should be updated, and that other elements should not be updated. Actions performed at step 814 are further described with regard to the logical DOM in logical DOM process 200, which is shown in FIG. 2.

At step 815, the client device 102 may render the updated elements (e.g., for display). In one or more instances, in rendering the updated elements, the client device 102 may interpolate, iterate, hide, show, add, remove, and/or change attributes in the logical DOM to reflect updates to the elements. Actions performed at step 815 are further described above with regard to re-rendering the bindable element and the logical DOM patching process, which are shown in FIGS. 2 and 5 respectively.

Figure 8D:
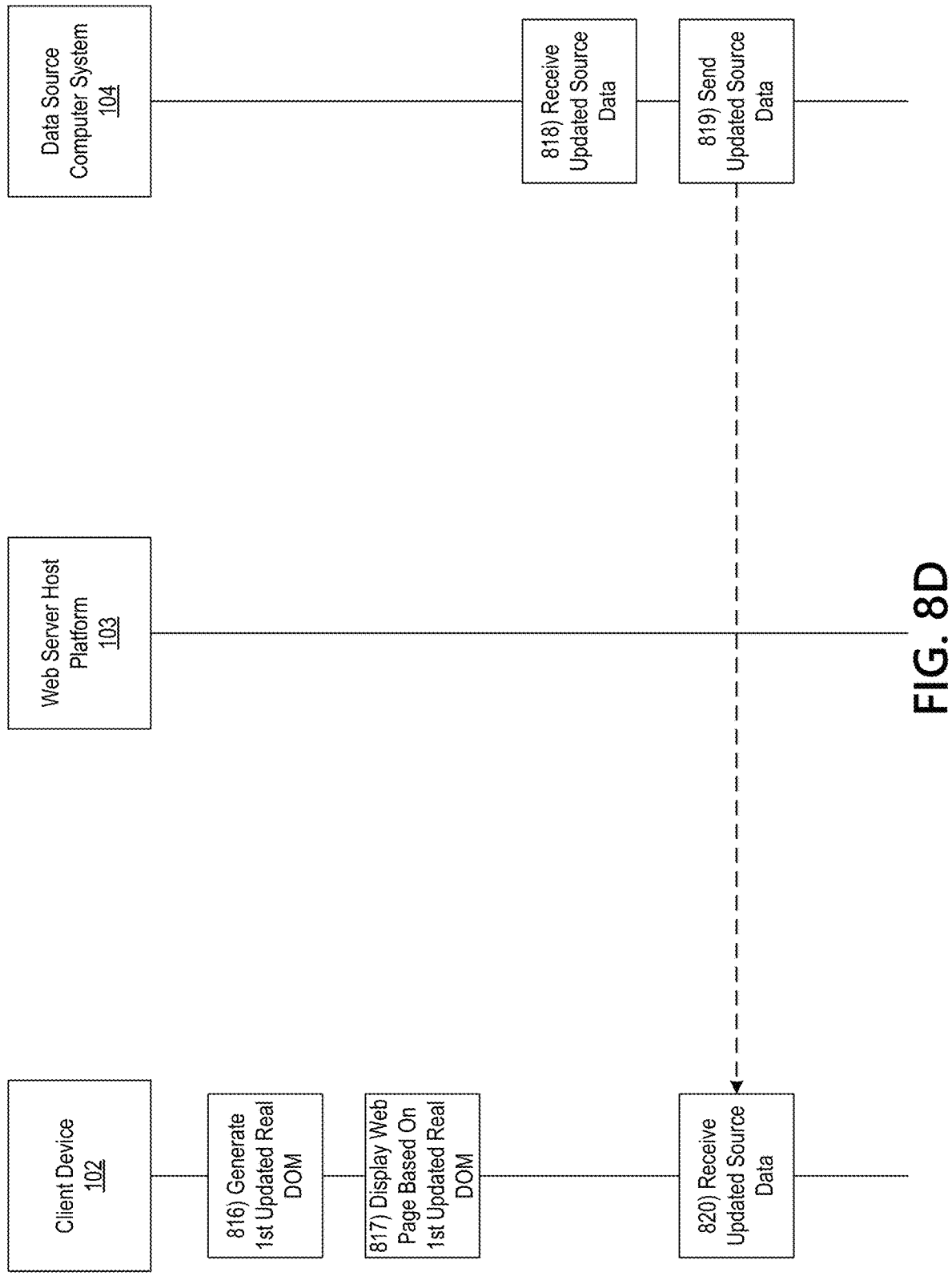

Referring to FIG. 8D, at step 816, the client device 102 may generate a first updated real DOM based on the rendered logical DOM from step 815. Actions performed at step 816 are further described above with regard to patching the changes in the logical DOM process 200, which is shown in FIG. 2. At step 817, the client device 102 may display the web page based on the first updated real DOM. In one or more instances, in displaying the web page based on the first updated real DOM, the client device 102 may display a graphical user interface similar to graphical user interface 905, which is shown in FIG. 9. For example, the graphical user interface may welcome a particular user to the website (which may be an online account portal provided by a financial institution). Although the graphical user interface 905 merely shows a generic "first name" and "last name," it should be understood that a user's actual name may be displayed on the graphical user interface 905. In this example, the source data received may have included names corresponding to various accounts. Additionally or alternatively, the graphical user interface 905 may include an account balance (e.g., for a checking account, savings account, or the like).

At step 818, the data source computer system 104 may receive updated source data. In one or more instances, in receiving the updated source data, the data source computer system 104 may receive new data that was not previously received. Additionally or alternatively, the data source computer system 104 may receive updated source data that replaces the previous source data. In receiving the updated source data, the data source computer system 104 may receive updated account information (e.g., names, balances, account numbers, contact information, or the like).

At step 819, the data source computer system 104 may send the updated source data to the client device 102. In one or more instances, the data source computer system 104 may send the updated source data to the client device 102 while the second wireless data connection is still established. In one or more instances, the data source computer system 104 may send the updated source data to the client device 102 through a different channel or over a different protocol than the channel or protocol through which the client device 102 obtained the web page and/or HTML content.

At step 820, the client device 102 may receive the updated source data sent at step 819. In one or more instances, the client device 102 may receive the updated source data via the communication interface 113 and while the second wireless data connection is established. In one or more instances, the client device 102 may receive the updated source data from a server different from the web server host platform 103.

Referring to FIG. 8E, at step 821, the client device 102 may retrieve the first updated real DOM from memory. Actions performed at step 821 may be similar to those described above with regard to step 807.

At step 822, the client device 102 may identify which elements to update using the updated data. In one or more instances, in identifying which elements to update, the client device 102 may perform actions similar to those described above with regard to step 807. For example, the client device 102 may determine which elements contain a binding directive and may determine that these elements should be updated. Additionally or alternatively, the client device 102 may determine which elements have corresponding references (between the logical DOM and the real DOM) in the key value store of the logical DOM. In doing so, the client device 102 may determine which elements to update without re-parsing the HTML corresponding to the real DOM.

At step 823, the client device 102 may re-render the identified elements. For example, the client device 102 may interpolate, iterate, hide, show, add, remove, and/or change the identified elements based on the updated source data. Actions performed at step 823 may be similar to those described above with regard to step 815.

At step 824, the client device 102 may generate a second updated real DOM using the re-rendered identified elements. In one or more instances, in generating the second updated real DOM, the client device 102 may perform actions similar to those described above with regard to step 816.

Referring to FIG. 8F, at step 825, the client device 102 may display the website based on the second updated real DOM. In one or more instances, in displaying the website, the client device 102 may display a graphical user interface similar to graphical user interface 1005. For example, rather than displaying a user's first name and last name on the website, the website may display the user's first initial and last name. In these instances, the client device 102 may change a DOM element corresponding to the first name, but might not change the other displayed elements (e.g., the title, last name, continue, or the like). As another example, the graphical user interface 1005 may include an updated account balance. For example, a paycheck may have been deposited into the user's account and thus the account balance might have increased. In displaying the website based on the second updated real DOM, the client device 102 may display the updated account balance.

Figure 11:
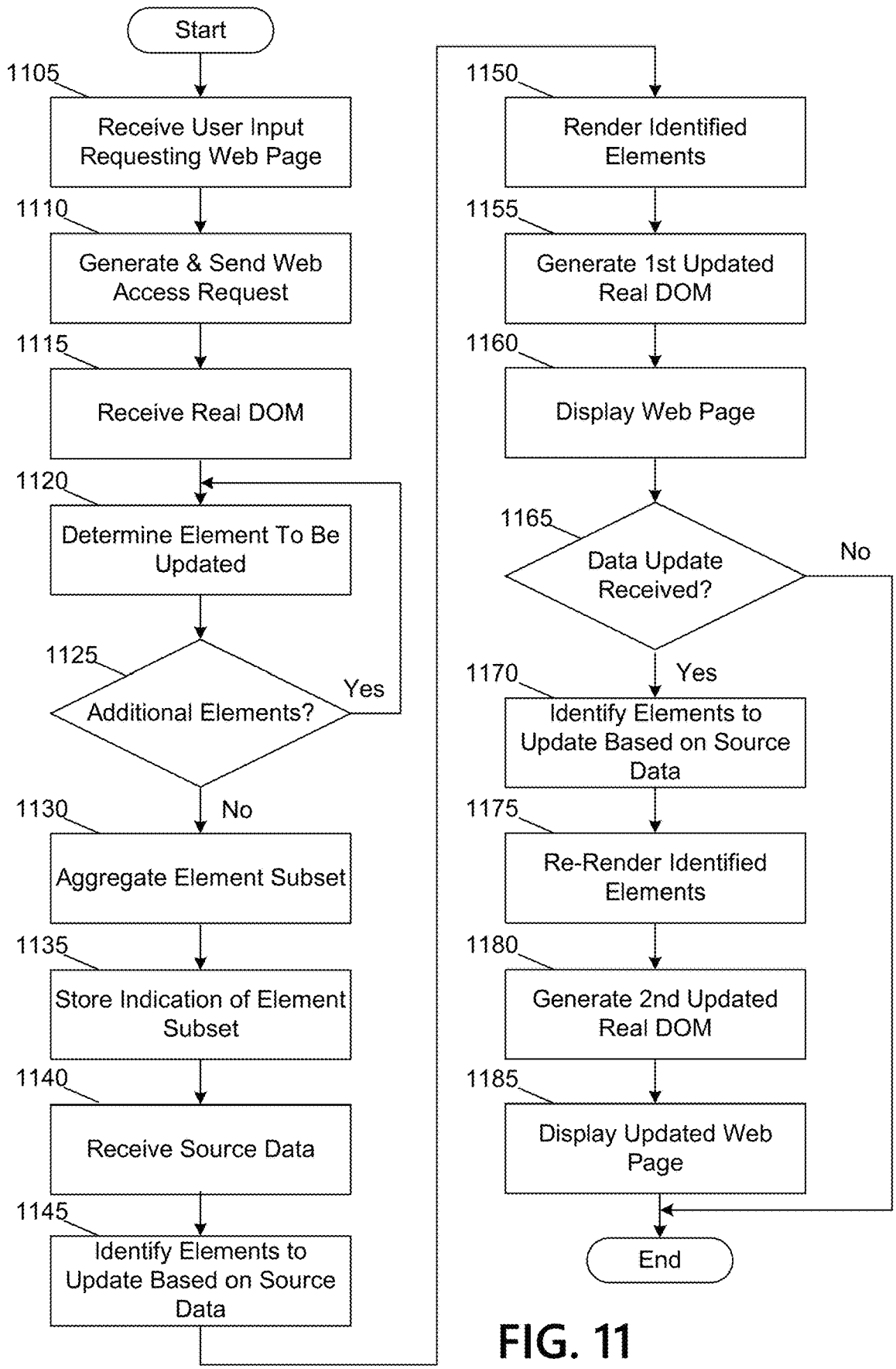
FIG. 11 depicts an illustrative method for deploying an enhanced processing system that performs just-in-time front end template generation using logical document object models in accordance with one or more example embodiments.

FIG. 11 depicts an illustrative method for just-in-time front end template generation using logical document object models in accordance with one or more example embodiments. Referring to FIG. 11, at step 1105, a computing device having at least one processor, a communication interface, and memory may receive user input requesting a web page. At step 1110, the computing device may generate and send a web access request, requesting access to the web page. At step 1115, the computing device may receive a real DOM corresponding to the web page. At step 1120, the computing device may determine whether an element of the real DOM should be updated based on whether the element includes a binding directive. At step 1125, the computing device may determine whether the real DOM includes additional elements. If the real DOM does include additional elements, the computing device may return to step 1120 to determine whether the additional elements should be updated. If the real DOM does not include additional elements, the computing device may proceed to step 1130.

At step 1130, the computing device may aggregate a subset of the elements that are to be updated. At step 1135, the computing device may store an indication of the element subset as a logical DOM that contains references to the real DOM. At step 1140, the computing device may receive source data. At step 1145, the computing device may identify elements to update based on the source data and the element subset. At step 1150, the computing device may update the element subset based on the source data, and may render the element subset (e.g., for display). At step 1155, the computing device may generate, based on the rendered element subset, a first updated real DOM. At step 1160, the computing device may use the first updated real DOM to display the requested web page. At step 1165, the computing device may determine whether a data updated was received. If a data update was not received, the method may end. If a data update was received, the computing device may proceed to step 1170.

At step 1170, the computing device may identify elements to update based on the updated source data and the element subset. At step 1175, the computing device may update the identified elements based on the updated source data and may re-render the identified elements (e.g., for display). At step 1180, the computing device may generate a second updated real DOM based on the re-rendered identified elements. At step 1185, the computing device may display and updated version of the requested web page based on the second updated real DOM.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing device comprising:
   at least one processor;
   a communication interface communicatively coupled to the at least one processor; and
   memory storing computer-readable instructions that, when executed by the processor, cause the computing device to:
   receive, from a web server host platform, a HyperText Markup Language (HTML) page comprising a document object model (DOM) structure, wherein the DOM structure includes one or more dynamic elements;
   parse the DOM structure associated with the HTML page received from the web server host platform to generate a logical DOM, wherein the logical DOM comprises a key value store identifying a subset of one or more dynamic elements to be updated based on data received from at least one data source different from the web server host platform, wherein the key value store does not include remaining dynamic elements of the one or more dynamic elements and wherein the remaining dynamic elements are not to be updated;

receive, from a data source computer system, source data;

modify the logical DOM based on the source data, wherein modifying the logical DOM based on the source data comprises replacing the subset of the one or more dynamic elements with corresponding values from the source data received from the data source computer system and wherein modifying the logical DOM produces a first updated real DOM;

render, after completing the modification of the logical DOM and without displaying the logical DOM, a first graphical user interface based on the first updated real DOM; and display the first graphical user interface.

2. The computing device of claim 1, wherein the memory stores additional computer-readable instructions that, when executed by the at least one processor, further cause the computing device to:

receive, after displaying the first graphical user interface, updated source data from the data source computer system;

modify the modified logical DOM based on the updated source data, wherein modifying the modified logical DOM based on the updated source data comprises replacing the one or more dynamic elements with corresponding values from the updated source data received from the data source computer system, and wherein modifying the modified logical DOM produces a second updated real DOM;

re-render the graphical user interface based on the second updated real DOM; and display the re-rendered graphical user interface.

3. The computing device of claim 2, wherein receiving the source data comprises receiving user account data.

4. The computing device of claim 3, wherein the memory stores additional computer-readable instructions that, when executed by the at least one processor, further cause the computing device to:

retrieve, after receiving the updated source data, the first updated real DOM; and determine, based on the first updated real DOM, the modified logical DOM.

5. The computing device of claim 2, wherein the memory stores additional computer-readable instructions that, when executed by the at least one processor, further cause the computing device to:

receive a user input corresponding to the source data; and send an indication of the user input corresponding to the source data to the data source computer system, wherein sending the indication of the user input corresponding to the source data causes the data source computer system to generate the updated source data.

6. The computing device of claim 1, wherein the key value store maintains a reference from each of the one or more dynamic elements to the DOM structure.

7. The computing device of claim 1, wherein the memory stores additional computer-readable instructions that, when executed by the at least one processor, further cause the computing device to receive user input requesting access to the first graphical user interface.

8. The computing device of claim 1, wherein the memory stores additional computer-readable instructions that, when executed by the at least one processor, further cause the computing device to:

identify, based on one or more bind attributes associated with tags in the HTML page, the one or more dynamic elements.

9. The computing device of claim 1, wherein the memory stores additional computer-readable instructions that, when executed by the at least one processor, further cause the computing device to store, locally on the computing device, the key value store.

10. A method comprising:

at a computing device comprising at least one processor, a communication interface, and memory:

receiving, from a web server host platform, a HyperText Markup Language (HTML) page comprising a document object model (DOM) structure, wherein the DOM structure includes one or more dynamic elements;

parsing the DOM structure associated with the HTML page received from the web server host platform to generate a logical DOM, wherein the logical DOM comprises a key value store identifying a subset of one or more dynamic elements to be updated based on data received from at least one data source different from the web server host platform, wherein the key value store does not include remaining dynamic elements, and wherein the remaining dynamic elements are not to be updated;

receiving, from a data source computer system, source data;

modifying the logical DOM based on the source data, wherein modifying the logical DOM based on the source data comprises replacing the subset of the one or more dynamic elements with corresponding values from the source data received from the data source computer system, and wherein modifying the logical DOM produces a first updated real DOM;

rendering, after completing the modification of the logical DOM and without displaying the logical DOM, a first graphical user interface based on the first updated real DOM; and displaying the first graphical user interface.

11. The method of claim 10, further comprising:

receiving, after displaying the first graphical user interface, updated source data from the data source computer system;

modifying the modified logical DOM based on the updated source data, wherein modifying the modified logical DOM based on the updated source data comprises replacing the one or more dynamic elements with corresponding values from the updated source data received from the data source computer system, and wherein modifying the modified logical DOM produces a second updated real DOM;

re-rendering the graphical user interface based on the second updated real DOM; and display the re-rendered graphical user interface.

12. The method of claim 11, wherein receiving the source data comprises receiving user account data.

13. The method of claim 12, further comprising:

retrieving, after receiving the updated source data, the first updated real DOM; and determining, based on the first updated real DOM, the modified logical DOM.

14. The method of claim 11, further comprising:

receiving a user input corresponding to the source data; and sending an indication of the user input corresponding to the source data to the data source computer system, wherein sending the indication of the user input corresponding to the source data causes the data source computer system to generate the updated source data.

15. The method of claim 10, wherein the key value store maintains a reference from each of the one or more dynamic elements to the DOM structure.

16. The method of claim 10, further comprising receiving user input requesting access to the first graphical user interface.

17. The method of claim 10, further comprising:
identifying, based on one or more bind attributes associated with tags in the HTML page, the one or more dynamic elements.

18. The method of claim 10, further comprising:
storing, locally on the computing device, the key value store.

19. One or more non-transitory computer-readable media storing instructions that, when executed by a computing device comprising at least one processor, a communication interface, and memory, cause the computing device to:
receive, from a web server host platform, a HyperText Markup Language (HTML) page comprising a document object model (DOM) structure, wherein the DOM structure includes one or more dynamic elements;
parse the DOM structure associated with the HTML page received from the web server host platform to generate a logical DOM, wherein the logical DOM comprises a key value store identifying a subset of one or more dynamic elements to be updated based on data received from at least one data source different from the web server host platform, wherein the key value store does not include remaining dynamic elements of the one or more dynamic elements and wherein the remaining dynamic elements are not to be updated;
receive, from a data source computer system, source data;
modify the logical DOM based on the source data, wherein modifying the logical DOM based on the source data comprises replacing the subset of the one or more dynamic elements with corresponding values from the source data received from the data source computer system, and wherein modifying the logical DOM produces a first updated real DOM;
render, after completing the modification of the logical DOM and without displaying the logical DOM, a first graphical user interface based on the first updated real DOM; and
display the first graphical user interface.

20. The one or more non-transitory computer-readable media of claim 19, wherein the memory stores additional instructions that, when executed by the at least one processor, further cause the computing device to:
receive, after displaying the first graphical user interface, updated source data from the data source computer system;
modify the modified logical DOM based on the updated source data, wherein modifying the modified logical DOM based on the updated source data comprises replacing the one or more dynamic elements with corresponding values from the updated source data received from the data source computer system, and wherein modifying the modified logical DOM produces a second updated real DOM;
re-render the graphical user interface based on the second updated real DOM; and
display the re-rendered graphical user interface.

* * * * *